(No Model.)
J. L. SULLIVAN.
NUT AND WASHER FOR VEHICLE AXLES.
No. 423,191. Patented Mar. 11, 1890.
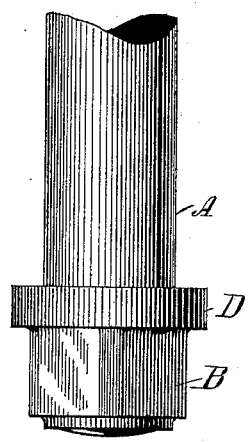
Fig. 1.
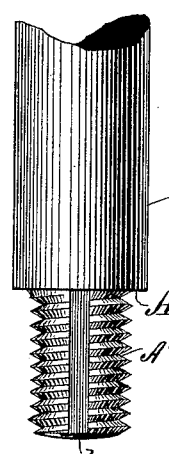
Fig. 4.
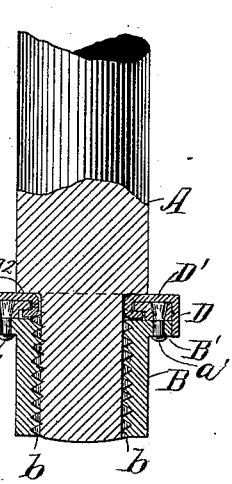
Fig. 3.
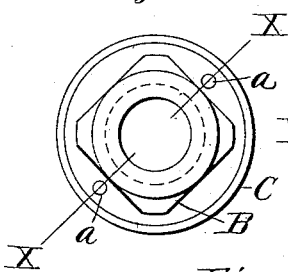
Fig. 2.
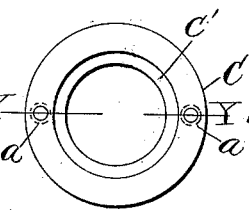
Fig. 7.
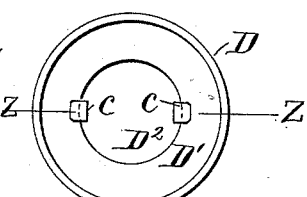
Fig. 5.
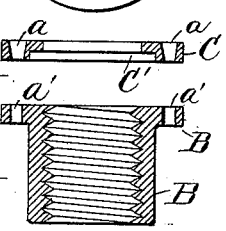
Fig. 8.
Fig. 6.
Fig. 9.
WITNESSES:
Henry Thiebrath
C. Sedgwick
INVENTOR:
J. L. Sullivan
BY Munn & Co.
ATTORNEYS

UNITED STATES PATENT OFFICE.

JONATHAN L. SULLIVAN, OF AUSTIN, TEXAS.

NUT AND WASHER FOR VEHICLE-AXLES.

SPECIFICATION forming part of Letters Patent No. 423,191, dated March 11, 1890.

Application filed October 28, 1889. Serial No. 328,456. (No model.)

*To all whom it may concern:*

Be it known that I, JONATHAN L. SULLIVAN, of Austin, in the county of Travis and State of Texas, have invented a new and useful Improvement in Nut-Holding Washers for Vehicles and other Purposes, of which the following is a full, clear, and exact description.

The object of my invention is to produce a simple, cheap, and practical device whereby the nuts on vehicle-axles will be secured from unscrewing when the wheels are moved rearwardly, said device being also applicable to other mechanism where nuts are used that are liable to be loosened by frictional contact of hubs or other moving parts they engage.

With this object in view my invention consists in the construction of parts and their combination, as is hereinafter described, and pointed out in the claims.

Reference is to be had to the accompanying drawings, forming a part of this specification, in which similar letters of reference indicate corresponding parts in all the figures.

Figure 1 is a perspective view of the end of an axle-spindle with the improved device in position on it. Fig. 2 is an end view of the improved nut-locking and friction-absorbing washer. Fig. 3 is a partly sectional view of the outer end of an axle-spindle with the improved device shown in section longitudinally, taken on the line $x\,x$ in Fig. 2. Fig. 4 is a perspective view of the end of an axle-spindle with the nut removed. Fig. 5 is a detached face view of the outer shell of the composite washer viewed in the direction of the arrow in Fig. 6. Fig. 6 is a cross-section of the outer shell of the washer, taken on the line $z\,z$ in Fig. 5. Fig. 7 is a face view of a cap-ring, which is to be seated in the outer shell of the washer, and also be secured to the radial flange of the nut on which the complete device is placed. Fig. 8 is a transverse section of the ring shown in Fig. 7, and Fig. 9 is a longitudinal section of the nut on which the washer is to be secured.

As ordinarily constructed, the nuts on vehicle-axles are liable to be lost when the vehicle is moved rearwardly, as this retrograde motion of the wheels causes their hubs to unscrew the nuts by their frictional contact, resulting in the loss of the nut and a possible worse accident to the vehicle and its occupants.

The preferred use of the nut-holding washer to be described is the retention in place of nuts for axle-spindles of all kinds of vehicles using revoluble wheels.

In the drawings, A represents a section of an axle-spindle with its reduced threaded end A' channeled to afford two opposite shallow grooves $b$, that are of suitable width for their use, which will be further explained.

The nut B is preferably squared, as shown, and is provided with an integral radial flange B', formed at its inner end. A cap-ring C is provided of the same diameter as the flange B', and is thereto secured by rivets $a$, inserted in aligning perforations $a$, formed in the cap-ring and flange, whereby these parts are firmly attached, as by rivets $a'$. The cap-ring C is reduced in thickness from its inner edge outwardly a proper distance to produce an annular channel C', which, when the ring C and flange B' are secured together, affords an annular recess.

An outer cylindrical shell D is constructed having an inwardly-extended radial flange D' formed on its inner end, the orifice $D^2$, which defines the inner edge of the flange D', being of such relative diameter that it will permit the shell to be slipped upon the threaded end of the bolt. At opposite points on the inner edge of the flange D' the similar ears $c\,c$ are formed integral with said flange. The ears $c\,c$ are bent into hook shape after the cap-ring C is seated within the shell D, and it is important that the ring shall be of such diametrical size that it will loosely engage the inner surface of the shell when in place. By turning the ears $c\,c$ over the reduced inner edge of the cap-ring C said ears will lie in the annular recess previously mentioned, and thus loosely retain the ring and shell together. The ears $c\,c$ are projected a proper distance within the orifice $D^2$, so that they are adapted to engage the longitudinal grooves $b$, formed in the threaded end of the axle-spindle, which provision will allow the shell D and attached ring C to slide inwardly on the spindle end A' until the threads of the nut B engage the mating threads of the spindle end. Then the nut may be revolved thereon to screw it in place, and at the same time the compound washer will slide before it, held from rotation.

When the nut B is screwed on the spindle until the washer-shell D is in contact with the shoulder $A^2$ of the spindle, it will receive the frictional action of the wheel-hub (not shown) and permit the nut to remain as it was adjusted.

Having thus described my invention, what I claim as new, and desire to secure by Letters Patent, is—

1. The combination, with a flanged nut, of a ring secured to the nut and a shell adapted to receive the ring and flange of the nut and provided with ears projecting into the orifice of the shell and adapted to engage the ring and hold the parts loosely together, substantially as herein shown and described.

2. The combination, with a threaded end on an axle-spindle, which is longitudinally grooved on opposite sides of the thread, and a radially-flanged nut made to engage the threaded end of the spindle, of a cap-ring having an annular recess formed on one side from its inner edge outwardly, said ring being secured upon the radial flange of the nut, and a cylindrical outer shell having an inwardly-extended flange on one end, and ears on the edge of said flange, which hook over the reduced edge of the cap-ring, and also slide in the grooves of the threaded spindle end, substantially as set forth.

JONATHAN L. SULLIVAN.

Witnesses:
 FRANZ FISET,
 PALMER KIRK.